United States Patent
Kazaoka et al.

(10) Patent No.: US 8,226,282 B2
(45) Date of Patent: Jul. 24, 2012

(54) VEHICLE LAMP

(75) Inventors: Naoki Kazaoka, Shizuoka (JP);
Masahiro Fukumuro, Shizuoka (JP);
Kyouhei Akiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 258 days.

(21) Appl. No.: 12/639,792

(22) Filed: Dec. 16, 2009

(65) Prior Publication Data
US 2010/0149829 A1 Jun. 17, 2010

(30) Foreign Application Priority Data
Dec. 17, 2008 (JP) .................... 2008-321599

(51) Int. Cl.
*B60Q 1/00* (2006.01)
(52) U.S. Cl. ........ 362/519; 362/511; 362/514; 362/516; 362/545
(58) Field of Classification Search .............. 362/507, 362/511, 514, 516, 519, 545
See application file for complete search history.

(56) References Cited

U.S. PATENT DOCUMENTS

| | | | | |
|---|---|---|---|---|
| 6,123,442 A | * | 9/2000 | Freier et al. | 362/559 |
| 2004/0184286 A1 | | 9/2004 | De Lamberterie | |
| 2004/0202003 A1 | * | 10/2004 | Lyst, Jr. | 362/511 |
| 2008/0186726 A1 | * | 8/2008 | Okada | 362/509 |

FOREIGN PATENT DOCUMENTS

| | | |
|---|---|---|
| JP | 6-295002 A | 10/1994 |
| JP | 2004-227934 A | 8/2004 |
| JP | 2005-114894 A | 4/2005 |
| WO | 03/026031 | 3/2003 |

OTHER PUBLICATIONS

Korean Office Action issued in Korean Application No. 10-2009-0123911 dated Aug. 29, 2011 and English translation thereof, 6 pages.
Chinese Office Action issued in Chinese Application No. 200910252511.1 dated Aug. 24, 2011 and English translation thereof, 11 Pages.
International Search Report dated Dec. 24, 2002, 4 pages.
First Office Action issued in Chinese Application No. 200910252511.1 dated Jan. 10, 2011 and English translation thereof, 9 pages.

* cited by examiner

*Primary Examiner* — Evan Dzierzynski
(74) *Attorney, Agent, or Firm* — Osha Liang LLP

(57) ABSTRACT

A vehicle lamp includes a light guide including: a first end surface; a second end surface opposite to the first end surface; a front side surface; and a back side surface opposite to the front side surface; a light source disposed to face the first end surface of the light guide so as to emit light toward the first end surface; and a reflector disposed to face the back side surface of the light guide. The light is incident on the first end surface and travels toward the second end surface along an longitudinal direction of the light guide. A first beam of the light is output from the front side surface of the light guide. A second beam of the light is output from the back side surface, and reflected by the reflector to travel toward a forward area of the vehicle lamp.

9 Claims, 3 Drawing Sheets

VEHICLE LAMP

BACKGROUND OF INVENTION

CROSS-REFERENCE TO RELATED APPLICATIONS

This application claims priority from Japanese Patent Application No. 2008-321599, filed on Dec. 17, 2008, the entire contents of which are hereby incorporated by reference.

FIELD OF THE INVENTION

The present disclosure relates to a vehicle lamp and, more particularly, a vehicle lamp using a light guide.

RELATED ART

In the related art, as a vehicle lamp used as the tail lamp or the stop lamp, there exists a vehicle lamp in which plural LEDs are arranged on one end portion of a rod-like light guide to obtain a linear light emission (see e.g., WO03/026031).

Meanwhile, in the tail lamp or the stop lamp, a luminous area in excess of a certain value needs to be ensured under the laws and the regulations. Also, in view of the appearance during the lighting, in some cases, the luminous area should be increased. In the above vehicle lamp using the light guide, when the luminous area should be increased as a whole, it may be considered that the size of the light guide is increased. However, in this case, a luminance is lowered due to the light diffusion. In order to compensate the reduction in the luminance, it may be considered that the number of LEDs is increased or an output light of LEDs is increased. On the other hand, in such cases, cost and power consumption are increased.

SUMMARY OF INVENTION

It is an illustrative aspect of the present invention to provide a vehicle lamp using a light guide whose luminous area is increased as compared with the related art vehicle lamp.

According to one or more aspects of the present invention, there is provided a vehicle lamp comprising: a light guide comprising: a first end surface; a second end surface opposite to the first end surface; a front side surface; and a back side surface opposite to the front side surface; a light source disposed to face the first end surface of the light guide so as to emit light toward the first end surface; and a reflector disposed to face the back side surface of the light guide, wherein the light is incident on the first end surface and travels toward the second end surface along an longitudinal direction of the light guide, wherein a first beam of the light is output from the front side surface of the light guide, and wherein a second beam of the light is output from the back side surface, and reflected by the reflector to travel toward a forward area of the vehicle lamp.

Other aspects and advantages of the present invention will be apparent from the following description, the drawings, and the claims.

DETAILED DESCRIPTION

Figure 1:
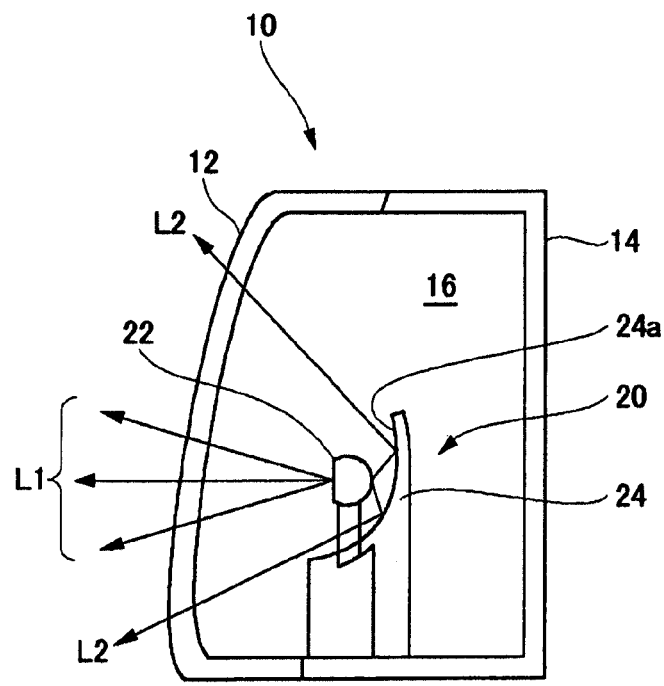
FIG. 1 is a sectional view showing a vehicle lamp according to an exemplary embodiment of the present invention.

Exemplary embodiments of the present invention will be now described in detail with reference to the drawings. FIG. 1 is a sectional view of a vehicle lamp 10 according to an exemplary embodiment of the present invention. The vehicle lamp 10 according to the present embodiment is used as a tail lamp or a stop lamp provided to the rear side of the vehicle.

The vehicle lamp 10 is provided with a lamp body 14 and a transparent cover 12 for covering a front opening of the lamp body 14. The lamp body 14 and the cover 12 forms a lamp chamber 16. A light guide 22 and a reflector 24 are provided in the lamp chamber 16.

Figure 2:
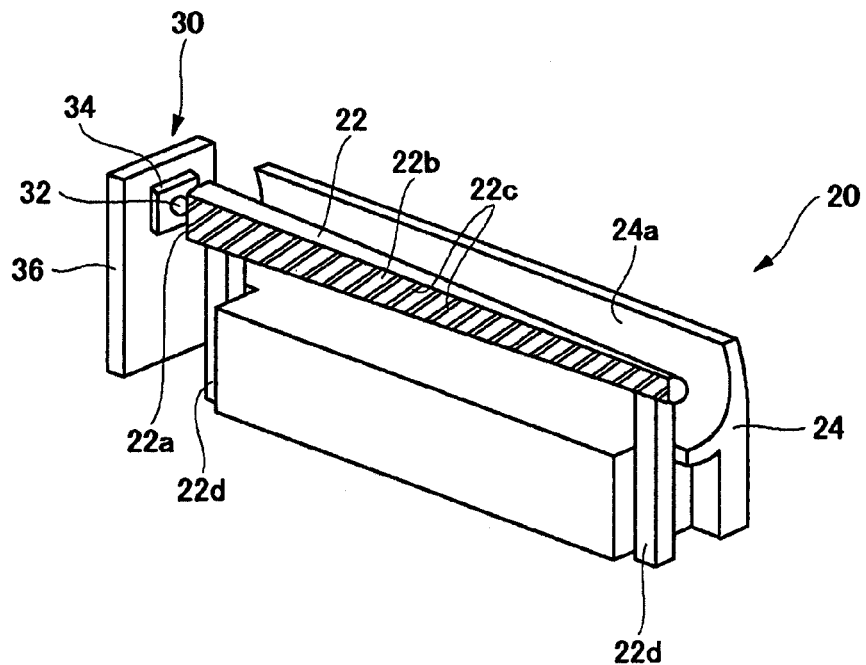
FIG. 2 is a perspective view of a lighting unit.
Figure 3:
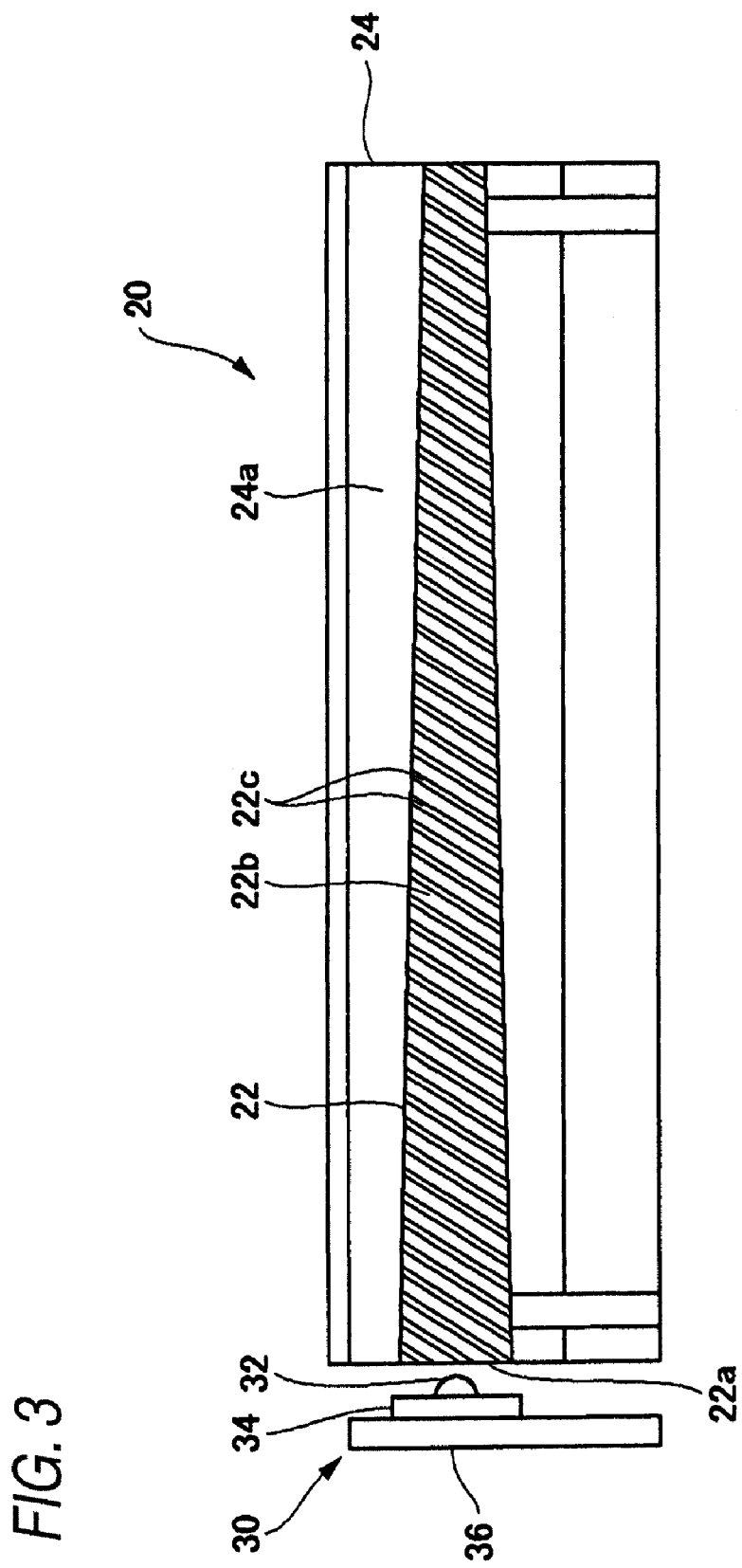
FIG. 3 is a front view of the lighting unit.

FIG. 2 is a perspective view of the lighting unit 20 shown in FIG. 1. Also, FIG. 3 is a front view of the lighting unit 20 shown in FIGS. 1 and 2. As shown in FIGS. 2 and 3, the lighting unit 20 includes the light guide 22, the reflector 24, and a light emitting unit 30.

The light guide 22 is a rod-like light guiding member that is formed by extrusion-molding a transparent resin, such as an acrylic resin. A cross sectional shape of the light guide 22 is an almost elliptical shape when viewed from a direction orthogonal to the longitudinal direction. One end surface of the light guide 22 is used as an incident surface 22a on which the light emitted from the light emitting unit 30 is incident. Also, a front surface 22b of one side surface of the light guide 22 is an almost flat surface, and steps 22c for diffusing the light are formed on the front surface 22b. In the present embodiment, the steps 22c are formed like an oblique line. Also, in the present embodiment, the light guide 22 is formed such that its sectional area that is orthogonal to the longitudinal direction is tapered from the incident surface 22a to the other side surface. The light guide 22 is supported by supporting portions 22d that are provided to both end portions. Thus, the light, which is incident onto the incident surface 22a, is guided inside the light guide 22 along the longitudinal direction thereof.

The light emitting unit 30 is a light source that emits the light to the light guide 22. The light emitting unit 30 includes an LED 32 that emits the light to the incident surface 22a of the light guide 22, a substrate 34 that supplies electric current to the LED 32, and a heat sink 36 for radiating heat generated from the LED 32.

The reflector 24 is a rod-like reflector. The reflector 24 is arranged along the longitudinal direction of the light guide 22. The reflector 24 reflects a part of the light, which is emitted from the side surface of the light guide 22, to the area ahead of the lighting equipment. A reflecting surface 24a of the reflector 24 is formed like an almost circular arc in a direction orthogonal to its longitudinal direction, and is formed to cover the light guide 22 at the back surface side of the light guide 22. In the present embodiment, the reflector 24 is formed such that the size of the reflecting surface 24a is substantially constant along the longitudinal direction of the light guide 22. That is, the outer periphery surface of the reflecting surface 24a is substantially constant along the longitudinal direction in the cross section.

Next, an operation of the vehicle lamp 10 will be described. In FIG. 1, the light emitted from the vehicle lamp 10 is indicated with an arrow. In the vehicle lamp 10, when electric current is supplied to the LED 32, the light emitted from the LED 32 is incident on the incident surface 22a of the light guide 22. The light incident on the light guide 22 is output from the side surface of the light guide 22, while traveling through the light guide 22. Here, the light output from the front surface 22b of the light guide 22 is diffused by the steps 22c, and then is output to the forward area of the vehicle lamp via the cover 12 (light beams indicated with a reference symbol L1). Meanwhile, the light output from the back surface of the light guide 22 is reflected by the reflecting surface 24a of the reflector 24, and then is output to the forward area of the vehicle lamp via the cover 12 (light beams indicated with a reference symbol L2).

In this manner, in the vehicle lamp 10 according to the present embodiment, both the light beam L1 directly output from the front surface 22b of the light guide 22, and the light beam L2 reflected by the reflecting surface 24a of the reflector 24 are output to the forward area of the vehicle lamp. Also, an area of the reflecting surface 24a acts as a luminous area as a whole, and, thus, the vehicle lamp using the reflector 24 can have a luminous area larger than that in a light guide 22 not using the reflector 24. Further, according to the present embodiment, in order to increase the luminous area, there is no need that a size of the light guide 22 should be increased, the number of the LED 32 should be increased, or an output light of the LED 32 should be increased. Therefore, the luminous area can be increased while cost and/or power consumption can be suppressed.

Also, in the vehicle lamp 10 according to the present embodiment, the light guide 22 is formed such that its sectional area that is orthogonal to the longitudinal direction is tapered from the incident surface 22a to the other side surface. In this case, the amount of light that propagates through the light guide 22 is reduced from the incident surface 22a to the other end surface. In this case, because the light is concentrated by reducing the sectional area of the light guide 22, the light output from the light guide 22 is substantially uniform along the longitudinal direction of the light guide 22. Those skilled in the art will appreciate that the optimum way for reducing the sectional area to make the light output from light guide 22 substantially uniform depends on the shape or material of the light guide 22, but it can be determined adequately through the experiment or simulation.

Also, in the vehicle lamp 10 according to the present embodiment, the reflector 24 is formed such that the size of the reflecting surface 24a is substantially constant along the longitudinal direction of the light guide 22. In this case, because the sectional area of the light guide 22 is tapered from the incident surface 22a to the other end surface, the luminous area of the vehicle lamp can be substantially constant as a whole, and a given luminous area required for the vehicle lamp can be ensured.

FIGS. 4A to 4D are views showing variations of the light guide 22 according to the above embodiment. In the light guide 22 shown in FIG. 4A, the shape of the steps 22c is similar to that in the above embodiment, but the area of the front surface 22b is formed larger than that in the above embodiment. In this case, the luminous area having high luminance can be increased in accordance with the increase in the area of the front surface 22b.

Figure 4A:
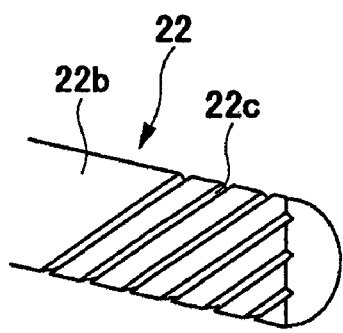
FIGS. 4A to 4D are views showing variations of the light guide respectively.
Figure 4B:
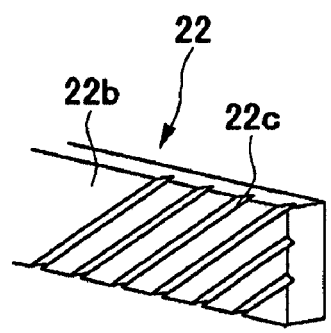

As shown in FIG. 4B, the cross section of the light guide 22 that is orthogonal to the longitudinal direction is formed like a rectangular shape. The shape of the steps 22c formed on the front surface 22b is similar to that shown in FIG. 4A. In this case, the reflecting surface 24a of the reflector 24 may be formed to correspond to the shape of the light guide 22.

Figure 4C:
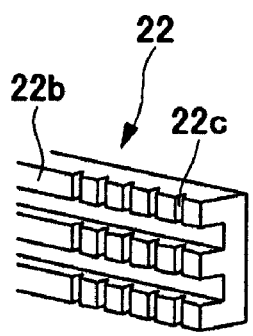
Figure 4D:
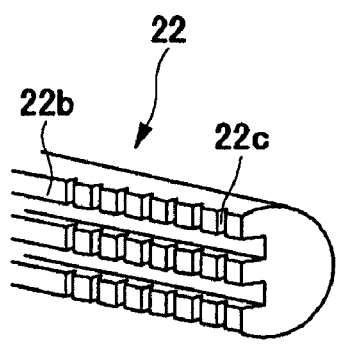

In the light guide 22 shown in FIG. 4C, the cross sectional shape of the light guide 22 has the rectangular shape as shown in FIG. 4B, but the shape of the steps 22c formed on the front surface 22b is different from that in FIG. 4B. Meanwhile, in the light guide 22 shown in FIG. 4D, the cross sectional shape of the light guide 22 is similar to those in FIGS. 2 and 3, but the shape of the steps 22c formed on the front surface 22b is different from those in FIGS. 2 and 3. In FIGS. 4C and 4D, the steps 22c are formed as the finer patterns. In this manner, because the steps 22c are formed into different shapes, the light distributing patterns that are novel in an aspect of design can be obtained.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

For example, the light guide may be formed such that its sectional area that is orthogonal to its longitudinal direction is gradually increased from the incident surface to the other end surface. Because the sectional area is gradually increased in this manner, it is possible to make a gradation light emission whose luminous intensity is gradually decreased, and the vehicle lamp that is novel in an aspect of design can be realized. For example, when the vehicle lamp is used as the tail lamp, a luminous intensity is gradually decreased from the center of the vehicle toward the left and right sides. Thus, the novel light distribution patterns can be created as compared with light distribution patterns whose luminous is uniform. The way to increase the sectional area can be determined depending on a desired light emission pattern through the experiment or simulation results.

Also, the reflector may be formed such that the size of the reflecting surface is changed along the longitudinal direction of the light guide. Namely, the outer periphery surface of the reflecting surface in the cross section that is orthogonal to the longitudinal direction is changed along the longitudinal direction. For example, the size of the reflecting surface may be increased or decreased along the longitudinal direction of the light guide. In this case, because a luminous area can be changed along the longitudinal direction, it is possible to provide the vehicle lamp that is novel in an aspect of design. For example, when the vehicle lamp is used as the tail lamp, a luminous area is gradually decreased from the center of the vehicle toward the right and left sides. Thus, the novel light distributing patterns can be created such that the light gradually disappears toward the right and left sides.

In the above embodiment, an LED is used as the light source. However, another light source, such as a bulb, may be used.

In FIGS. 2 and 3, the vehicle lamp formed into a linear shape is illustrated. However, the shape of the vehicle lamp is not limited to a linear shape, and, for instance, a curved shape may be employed. For example, when the vehicle lamp is used as the tail lamp, the shape of the vehicle lamp may be formed into a curved shape to correspond to the shape of the rear body of the vehicle.

The invention claimed is:

1. A vehicle lamp comprising:
   a light guide comprising:
      a first end surface;
      a second end surface opposite to the first end surface;
      a front side surface; and
      a back side surface opposite to the front side surface;
   a light source disposed to face the first end surface of the light guide so as to emit light toward the first end surface; and
   a reflector disposed to face the back side surface of the light guide, wherein the light is incident on the first end surface and travels toward the second end surface along an longitudinal direction of the light guide, wherein a first beam of the light is output from the front side surface of the light guide, wherein a second beam of the light is output from the back side surface, and reflected by the reflector to travel toward a forward area of the vehicle lamp, wherein the front side surface is substantially a flat surface, and the back side surface is substantially an elliptical surface, and wherein a plurality of steps are formed on the front side surface of the light guide.

2. The vehicle lamp according to claim 1, wherein a cross-section of the light guide that is orthogonal to the longitudinal direction of the light guide is tapered from the first end surface toward the second end surface.

3. The vehicle lamp according to claim 1, wherein a cross-section of the light guide that is orthogonal to the longitudinal direction of the light guide is increased from the first end surface toward the second end surface.

4. The vehicle lamp according to claim 1, wherein a reflecting surface of the reflector is substantially constant in a direction along the longitudinal direction of the light guide.

5. The vehicle lamp according to claim 1, wherein a reflecting surface of the reflector is changed in a direction along the longitudinal direction of the light guide.

6. The vehicle lamp according to claim 1, wherein a plurality of steps are formed on the front side surface of the light guide.

7. The vehicle lamp according to claim 1, wherein a cross-sectional shape of the reflector is an almost circular arc shape in a direction orthogonal to the longitudinal direction of the light guide.

8. The vehicle lamp according to claim 1, wherein the light source is an LED.

9. The vehicle lamp according to claim 1, wherein a cross-section shape of the light guide that is orthogonal to the longitudinal direction of the light guide is an almost elliptical shape.

* * * * *